Jan. 27, 1931. J. N. GOOD 1,790,211
FLUID PRESSURE BRAKE
Filed Jan. 26, 1929
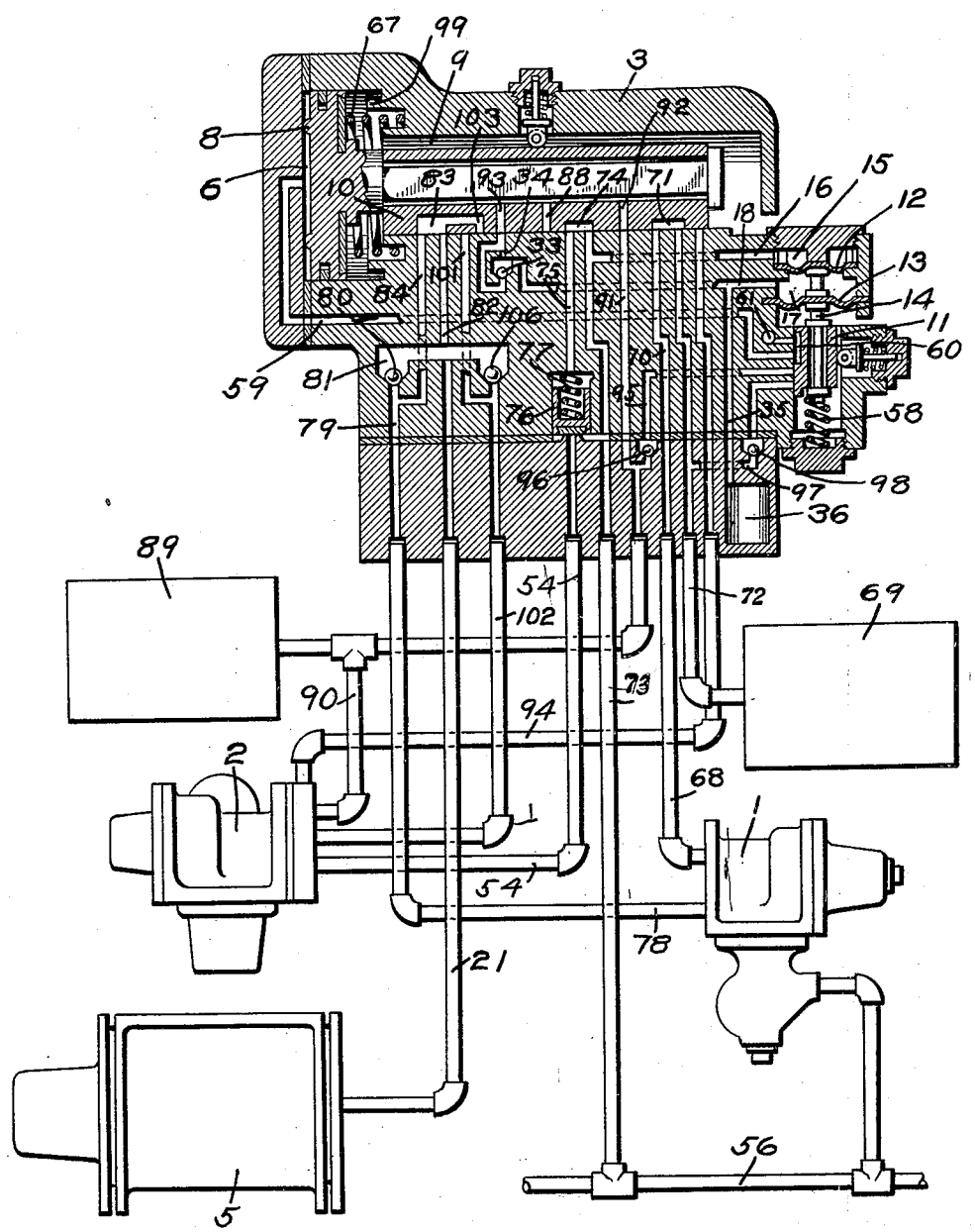
INVENTOR
JOHN N. GOOD
BY Wm. H. Cady
ATTORNEY Patented Jan. 27, 1931

1,790,211

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed January 26, 1929. Serial No. 335,184.

This invention relates to fluid pressure brakes, and more particularly to a brake equipment adapted to control the brakes for different classes of service, such as passenger and freight service.

The principal object of my invention is to provide a fluid pressure brake equipment adapted to control the brakes in different classes of service and having means for automatically cutting in the brake controlling means for controlling the brakes in one class of service while rendering the other brake controlling means inoperative to control the brakes.

Other objects and advantages will appear in the following more detailed description of the invention.

In the accompanying drawing, the single figure is a diagrammatic view, partly in section, of a fluid pressure brake equipment embodying my invention.

The equipment may comprise a valve device 1 for controlling the brakes in freight service, a valve device 2 for controlling the brakes in passenger service, a change-over valve device 3, and a brake cylinder 5.

The change-over valve device 3 may comprise a casing having a piston chamber 6, containing a piston 8 and a valve chamber 9 in open communication with the atmosphere, and containing a slide valve 10, adapted to be operated by the piston 8.

For controlling the operation of piston 8, a slide valve 11 is provided and for operating said valve, a pair of flexible diaphragms 12 and 13 are employed, said diaphragms being operatively connected to the valve 11 by a stem 14, and the diaphragm 13 having a greater area than the diaphragm 12.

The chamber 15 at one side of the diaphragm 12 is connected to a passage 16, which leads to a passage 73, communicating with the usual brake pipe 56. The chamber 17, intermediate the diaphragms 12 and 13 is connected to a passage 18 leading to the seat of slide valve 10, said passage containing a check valve 33 and having a restricted by-pass passage 34 for establishing communication around said check valve. Passage 18 is also connected to a passage 35 which leads to a volume chamber 36.

The automatic operation of the apparatus is effected according to the degree of standard brake pipe pressure carried. In passenger service a higher standard degree of brake pipe pressure is carried than in freight service, and it will be assumed that in freight service, the standard brake pipe pressure carried is less than 100 pounds, while the standard brake pipe pressure for passenger service is in excess of 100 pounds.

Assuming a car equipped with the improved brake equipment to be connected in a freight train, where the brake pipe pressure carried is less than 100 pounds, such degree of brake pipe pressure acting in diaphragm chamber 15 is less than the pressure of spring 58, so that the diaphragms 12 and 13 and the slide valve 11 are maintained in their upper or freight position by the pressure of the spring, as shown in the drawing.

In this position, passage 59, leading to piston chamber 6, is connected, through cavity 60 in slide valve 11, with an atmospheric exhaust port 61, so that piston chamber 6 is maintained at atmospheric pressure, permitting the spring 67 to hold the piston 8 in its left hand position.

With piston 8 in this position, the slide valve 10 is positioned so that cavity 71 connects passage 72, leading to the auxiliary reservoir 69, with a passage 70, leading to the auxiliary reservoir pipe 68 of the brake controlling valve device 1, so that the valve device 1 is connected to supply fluid under pressure from the brake pipe to the auxiliary reservoir when the brake pipe is charged with fluid under pressure.

The brake pipe 56 is connected to the upper face of valve piston 76, through passage 73, cavity 74 in slide valve 10, and passage 75, so that brake pipe pressure with the pressure of spring 77 holds said valve piston to its lower seat, in which communication from the brake pipe 56 to pipe 54, leading to the passenger service brake controlling valve device 2 is cut off.

The pipe 78, through which the valve device 1 supplies fluid under pressure to the brake cylinder, is connected to the brake cylinder 5, through passage 79, passage 84, cavity 83 in slide valve 10, passage 82, chamber 81, and pipe 21.

Pipe 102, through which fluid under pressure is supplied to the brake cylinder, by operation of the valve device 2, is connected to a passage 101, leading to the seat of slide valve 10. But in the freight service position of slide valve 10, this passage is blanked. The brake pipe 56 being cut off from the valve device 2, said valve device is rendered inoperative to control the brakes, and since the emergency reservoir 89 is therefore not charged with fluid under pressure, fluid under pressure will not be supplied through passage 91 to the diaphragm chamber 17.

When it is desired to effect an application of the brakes, with the parts in freight service position, as above described, upon reducing the brake pipe pressure, the freight service brake device 1 is operated in the usual manner to supply fluid under pressure from the auxiliary reservoir 69 to the brake cylinder 5. The brakes may be released by increasing the brake pipe pressure, so that the valve device 1 is operated to release fluid under pressure from the brake cylinder 5 in the usual manner.

If a car equipped with the improved apparatus be transferred from freight to passenger service, upon charging the brake pipe to the higher standard pressure carried in passenger service, the higher brake pipe pressure of spring 58, so that the diaphragms 12 15 is sufficient to overcome the opposing pressure of spring 58, so that the diaphragms 12 and 13 and slide valve 11 are shifted to their lower position, in which passage 97, leading past check valve 98 to auxiliary reservoir passage 72, is connected, through cavity 60 in slide valve 11, with passage 59, leading to piston chamber 6.

Fluid under pressure from the auxiliary reservoir 69 is then supplied to piston chamber 6 and piston 8 is thereupon shifted to the right, moving the slide valve 10 to its passenger service position.

In the passenger service position, the auxiliary reservoir passage 72 is connected to the auxiliary reservoir pipe 94 of the passenger service valve device 2, through cavity 71, so that when the valve device 2 is cut into operation, the auxiliary reservoir 69 will be charged with fluid under pressure by operation of the passenger service valve device 2.

Passage 75, leading to the upper side of the valve piston 76, is connected to the atmosphere, through port 88, so that brake pipe pressure, acting on the outer exposed area of the valve piston, on its lower face, operates to shift the valve piston to its upper seat and thereby communication is established from the brake pipe 56 to the pipe 54, which is the brake pipe connection to the valve device 2.

The valve device 2 is thus connected up so that the parts thereof are supplied with fluid from the brake pipe, and passage 91 being blanked by slide valve 10, the emergency reservoir 89 is charged with fluid under pressure, by operation of the passenger service valve device 2.

Passage 18 is connected, through a port extension 103 of cavity 83, with passage 82, so that when the brakes are applied, the diaphragm chamber 17, as well as the volume chamber 36, are charged with fluid under pressure as supplied to the brake cylinder.

When the brake pipe pressure is reduced to effect an application of the brakes, the valve device 2 is operated to supply fluid under pressure from the auxiliary reservoir 69 to the brake cylinder 5, while the valve device 1 is rendered inoperative, since the auxiliary reservoir is cut off from the valve device 1.

The brakes may be released by increasing the brake pipe pressure, so that the valve device 2 is operated to release fluid under pressure from the brake cylinder 5. If, while operating in passenger service, the brake pipe pressure is reduced to a degree less than that employed in freight service, the change-over valve device will remain in the passenger service position, since the reduction in brake pipe pressure operates to apply the brakes, and since when the brakes are applied, fluid at the pressure supplied to the brake cylinder, is also supplied through the port 103 and passage 18 to the diaphragm chamber 17. The fluid pressure thus supplied to chamber 17 will then maintain the diaphragms 12 and 13 in the passenger service position, although the brake pipe pressure in chamber 15 is reduced.

When the brake pipe pressure is increased to effect the release of the brakes, fluid under pressure is released from the brake cylinder, but the release of fluid from diaphragm chamber 17 and the volume chamber 36 is retarded, since check valve 33 prevents back flow through the main passage, and fluid from the chamber 17 can be released only by way of the restricted by-pass passage 34.

The fluid pressure in diaphragm chamber 17 is thus prevented from dropping quick enough to allow the upper movement of the diaphragms 12 and 13 until the brake pipe pressure has been sufficiently restored to provide a pressure in chamber 15 such that the diaphragms will be maintained in the passenger service position.

If a car equipped with the improved apparatus is transferred from passenger to freight service, the pressure of fluid in the auxiliary reservoir is bled down by opening the usual auxiliary reservoir release valve (not shown) and the brake pipe pressure having been reduced from the passenger service standard to the freight service standard, the diaphragms 12 and 13 and the slide valve 11 are shifted upwardly to the freight service position by spring 58.

Piston chamber 6 is then vented through cavity 60 in slide valve 11 to exhaust port 61 and piston 8 with slide valve 10 is then shifted to the freight service position, in which the connections are made for rendering the freight service valve device 1 operative to control the brakes, in the manner hereinbefore described.

Fluid under pressure in the emergency reservoir 89 is vented to the atmosphere, in the freight service position of slide valve 10, through port 92. Diaphragm chamber 17 is connected, through passage 18, port 34, and port 93, with valve chamber 9 and the atmosphere, so that fluid under pressure is not supplied to said chamber in the freight service position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake equipment, the combination with a brake pipe, brake cylinder, and two valve devices for controlling the brakes in different classes of service, of valve means operative to render one of said valve devices operative to control the brakes while the other device is rendered inoperative, and means controlled by brake pipe pressure for controlling the operation of said valve means, said means being subject to brake cylinder pressure upon applying the brakes.

2. In a fluid pressure brake equipment, the combination with a brake pipe, brake cylinder, and two valve devices for controlling the brakes in different classes of service, of valve means operative to render one of said valve devices operative to control the brakes while the other device is rendered inoperative, and means controlled by brake pipe pressure for controlling the operation of said valve means, said means being subject to brake cylinder pressure upon applying the brakes by operation of one of said valve devices.

3. In a fluid pressure brake equipment, the combination with a brake pipe, brake cylinder, and two valve devices, one for controlling the brakes in passenger service and the other for controlling the brakes in freight service, of valve means operative to render one of said valve devices operative to control the brakes while the other valve device is rendered inoperative, and means controlled by brake pipe pressure for controlling the operation of said valve means, said means being subjected to brake cylinder pressure in applying the brakes by operation of the passenger service valve device to thereby prevent movement of said means from passenger service position.

4. In a fluid pressure brake equipment, the combination with a brake pipe, brake cylinder, and two brake controlling valve devices, of a change-over valve device movable to a position, by increase in fluid under pressure, for connecting the brake pipe to one brake controlling valve device and valve means operated by brake pipe pressure for supplying fluid under pressure to said change-over valve device, said valve means being subject to brake cylinder pressure with the change-over valve device in said position.

5. In a fluid pressure brake equipment, the combination with a brake pipe, brake cylinder, and two brake controlling valve devices, of a change-over valve device movable to a position, by increase in fluid under pressure, for connecting the brake pipe to one brake controlling valve device and valve means operated by brake pipe pressure for supplying fluid under pressure to said change-over valve device, said valve means being supplied with fluid at brake cylinder pressure in applying the brakes, and means for retarding the release of fluid supplied to said valve means.

In testimony whereof I have hereunto set my hand, this 21st day of January, 1929.

JOHN N. GOOD.